(12) United States Patent
Yatsenko et al.

(10) Patent No.: US 7,317,841 B2
(45) Date of Patent: Jan. 8, 2008

(54) SYSTEM AND METHOD FOR IMAGE NOISE REDUCTION USING A MINIMAL ERROR SPATIOTEMPORAL RECURSIVE FILTER

(75) Inventors: Dimitri Victorovich Yatsenko, Salt Lake City, UT (US); Daniel Mahonri Bates, Salt Lake City, UT (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 800 days.

(21) Appl. No.: 10/744,812

(22) Filed: Dec. 22, 2003

(65) Prior Publication Data

US 2005/0135698 A1 Jun. 23, 2005

(51) Int. Cl.
*G06K 9/40* (2006.01)
*G06G 7/02* (2006.01)
(52) U.S. Cl. ...................... 382/260; 708/819
(58) Field of Classification Search ........ 382/260–265; 708/819
See application file for complete search history.

(56) References Cited

U.S. PATENT DOCUMENTS

| | | | |
|---|---|---|---|
| 4,603,350 A | 7/1986 | Arbeiter et al. |
| 4,661,986 A | 4/1987 | Adelson |
| 4,663,660 A | 5/1987 | Fedele et al. |
| 4,672,444 A | 6/1987 | Bergen et al. |
| 4,674,125 A | 6/1987 | Carlson et al. |
| 4,692,806 A | 9/1987 | Anderson et al. |
| 4,694,413 A | 9/1987 | Arbeiter |
| 4,698,843 A | 10/1987 | Burt et al. |
| 4,703,514 A | 10/1987 | van der Wal |
| 4,709,394 A | 11/1987 | Bessler et al. |
| 4,718,104 A | 1/1988 | Anderson |
| 4,797,942 A | 1/1989 | Burt |
| 4,817,182 A | 3/1989 | Adelson et al. |
| 4,982,283 A | 1/1991 | Acampora |
| 5,276,513 A | 1/1994 | Van der Wal et al. |
| 5,315,670 A | 5/1994 | Shapiro |

(Continued)

FOREIGN PATENT DOCUMENTS

EP 0 777 891 B1 10/2001

OTHER PUBLICATIONS

Burt, P.J. and Adelson E.H., "The Laplacian Pyramid as a Compact Image Code," IEEE Trans., C-31:532-540, 1983.

*Primary Examiner*—Kanjibhai Patel
(74) *Attorney, Agent, or Firm*—McAndrews, Held & Malloy, Ltd.; Peter J. Vogel; Michael A. Dellapenna

(57) ABSTRACT

Certain embodiments of the present invention provide a system and method for reducing image noise with the use of a minimal error spatiotemporal recursive filter. An input image is filtered both temporally and spatially, producing a temporal output and a spatial output. Both the temporal output and the spatial output are correlated with the input image to produce a temporal correlation output and a spatial correlation output. The temporal correlation output and the spatial correlation output are mixed to generate a selecting signal. The selecting signal directly or indirectly determines the composition of an output image. The selecting signal may select a portion of the temporal output and a portion of the spatial output to compose an output image. Alternatively, the selecting signal may select either the temporal output or the spatial output to compose an output image.

15 Claims, 6 Drawing Sheets

U.S. PATENT DOCUMENTS

| | | |
|---|---|---|
| 5,321,776 A | 6/1994 | Shapiro |
| 5,909,516 A | 6/1999 | Lubin |
| 6,173,084 B1 | 1/2001 | Aach et al. |
| 6,259,489 B1 | 7/2001 | Flannaghan et al. |
| 6,310,982 B1 | 10/2001 | Allred et al. |
| 6,335,990 B1 | 1/2002 | Chen et al. |
| 6,910,060 B2 * | 6/2005 | Langan et al. .............. 708/819 |
| 2002/0028025 A1 | 3/2002 | Hoon |
| 2003/0123750 A1 | 7/2003 | Yu |
| 2005/0107982 A1 * | 5/2005 | Sun et al. ................... 702/179 |

* cited by examiner

SYSTEM AND METHOD FOR IMAGE NOISE REDUCTION USING A MINIMAL ERROR SPATIOTEMPORAL RECURSIVE FILTER

BACKGROUND OF THE INVENTION

The present invention generally relates to a system and method for reducing noise in fluoroscopic image processing. In particular, the present invention relates to a system and method for spatiotemporal filtration of fluoroscopic images.

Imaging systems encompass a variety of imaging modalities, such as x-ray systems, computerized tomography (CT) systems, ultrasound systems, electron beam tomography (EBT) systems, magnetic resonance (MR) systems, and the like. Imaging systems generate images of an object, such as a patient, for example, through exposure to an energy source, such as x-rays passing through a patient, for example. The generated images may be used for many purposes. For instance, the images may be used for detecting internal defects in a structure, detecting fluid flow within a structure, or showing the presence or absence of objects in a structure. Additionally, imaging systems may be used for minimally-invasive medical procedures and used during image-guided surgery.

One particular type of medical imaging modality is digital fluoroscopic imaging. During fluoroscopic image acquisition, multiple x-ray images are taken successively to form an image sequence or video. Each individual x-ray image is called a frame. Each frame is made up of pixels. The number of x-ray photons reaching the x-ray detector is finite, which results in quantum image noise. Image noise is an undesired effect that may limit a visibility of anatomical features or become otherwise distracting or disturbing to a viewer.

Modern image processing techniques in fluoroscopic systems use various filters to reduce image noise and enhance the visibility of features of interest. An example of a type of filter used to reduce image noise is an adaptive filter. Generally, adaptive filters interpret values associated with pixels. If a pixel falls within a given range of values, the pixel is considered noise, and the pixel is recomputed. If a pixel is outside of a given range, then the pixel is presumed sufficiently accurate and allowed to pass through the filter. Traditionally, there are two techniques used to recalculate pixel value and reduce unwanted fluoroscopic image noise using adaptive filters: temporal and spatial filtration.

Temporal filtration compares a current value of a target pixel with previous values of the same target pixel. A temporal filter may recalculate a noisy pixel by comparing the current value of the target pixel with previous values of the target pixel. That is, a temporal filter may replace a noisy pixel value with an average value of that pixel from several previous frames.

Temporal noise filtration is most effective in static image sequences. During sequences of little motion, successive images contain similar information, producing an average closely resembling the true value of the pixel. However, if an object is moving, a pixel's value may widely vary over successive images. Hence, successive images may contain dissimilar information. Averaging of dissimilar information may produce a value that may not resemble the true value of the current pixel. Therefore, temporal filtration is an unsatisfactory method of enhancing a moving image because the averaging of frames may produce unwanted motion blur or motion lag.

Spatial filtration compares a target pixel's current value with values of the target pixel's neighbors. The neighboring pixels are then used to compute a new value for the noisy pixel. The neighbors of a pixel are the pixels surrounding the target pixel in a current frame. A typical neighborhood may be a four pixel neighborhood, which consists of the target pixel, and the pixels directly north, south, east, and west. A four pixel neighborhood forms a diamond shape around the target pixel. Another typical pixel neighborhood is an eight pixel neighborhood. An eight pixel neighborhood consists of the target pixel, and the pixels north, south, east, west, northeast, northwest, southeast, and southwest. An eight pixel neighborhood forms a box around the target pixel. Many configurations of pixel neighborhoods currently exist.

Unlike temporal filtration, spatial noise filtration is equally effective for filtering static and dynamic objects in image sequences. During image sequences containing motion, the value of a target pixel may vary widely. As explained above, an averaging of a target pixel's value with the target pixel's value in previous frames, would produce motion lag. Nevertheless, a target pixel's neighborhood in the current image may generally contain similar information to the true value of the target pixel. An average value amongst a neighborhood may produce a value closely resembling the true value of the target pixel.

However, averaging among a neighborhood in a current frame may introduce unwanted spatial artifacts. Some typical unwanted spatial artifacts may be lost edges, false edges, intra-region smoothing, segmented appearance, "patchiness," or "blockiness." The spatial artifacts, present in dynamic regions of an image, are generally more tolerable than the motion lag caused by temporal filtration with equivalent noise reduction. However, for static objects in an image, spatial filtration introduces artifacts while temporal filtration does not. The artifacts consistently degrade an image, making details of the image difficult to view. Therefore, spatial filtration is an unsatisfactory method of enhancing static objects in a sequence.

Various combinations of spatial and temporal filters currently exist. Most combinations attempt to balance the inability of a spatial filter to effectively enhance static regions in an image versus the inability of a temporal filter to effectively enhance dynamic regions in an image. Typical combinations of spatial and temporal filters pass an image through both a spatial and temporal filter. As a result, most combinations of spatial and temporal filters introduce some degree of the disadvantages of both the spatial filter and the temporal filter into the image. The consequence being insufficient resolution of both static and dynamic regions of an image.

Therefore, a need exists for a system and method which may preserve spatial detail in static regions, while avoiding motion lag in dynamic regions. Such a system and method may minimize image noise while also minimizing unwanted artifacts and lag associated with temporal and spatial filters.

SUMMARY OF THE INVENTION

Certain embodiments of the present invention provide a system and method for reducing image noise with the use of a minimal error spatiotemporal recursive filter. In an embodiment, a system includes a temporal filtration unit that filters input data and produces an output. A spatial filtration unit filters input data and produces an output. A first local correlation unit correlates the input data with the temporal filter output and produces a temporal correlation output. A second local correlation unit correlates the input data with the spatial filter output and produces a spatial correlation output. A mixing unit coordinates the spatial correlation output and the temporal correlation output to produce a mixing unit output. In an embodiment, a multiplexer may be used to receive the mixing unit output. The multiplexer may select the temporal filter output or the spatial filter output based on the output of the mixing unit. Alternatively, a complementary unit may be used to receive the mixing unit output and generate a complement of the mixing unit output.

In an embodiment, a method involves acquiring an input signal to be de-noised. The method of de-noising involves filtering the input signal using a temporal filtration technique to produce a temporal filtration output. Similarly, the input signal is filtered using a spatial filtration technique to produce a spatial filtration output. Next, the temporal filtration output may be correlated with the input signal to produce a correlation temporal output. Similarly, the spatial filtration output may be correlated with the input signal to produce a correlation spatial output. Next, the correlation spatial output and the correlation temporal output may be mixed to produce an output signal. The temporal filtration output and/or the spatial filtration output may be selected based on the value of the output signal. The output signal may be used to de-noise the input image.

In an embodiment of the invention, a system uses a first spatial filtration unit for filtering data using a spatial filtration technique and generating a first spatial filtration output. A comparison unit is used for comparing a temporal comparison signal with a spatial comparison signal. The comparison unit output may represent a binary number. A multiplexer is used for receiving the comparison unit output and selecting either a temporal update signal or a spatial update signal. Finally, a delay unit is used for buffering an output signal and producing a delay unit output. The temporal update signal and the temporal comparison signal may be multiplied by a multiplication unit. An addition unit may be used to alter the data. Furthermore, an addition unit may be used to create the spatial update signal and the spatial comparison signal. The output signal may be the input data altered by the temporal update signal, the spatial update signal, or both the temporal update signal and the spatial update signal. Moreover, a second spatial filtration unit may be used to filter the output of the delay unit and generate a second spatial filtration output. The second spatial filtration output may be used to compute the temporal comparison signal. The delay unit output may be used to compute the temporal update signal.

In another embodiment, a minimal error spatiotemporal recursive filter may be used with a multiresolution spatial filter. The minimum error spatiotemporal recursive filter may be implemented in the synthesis portion of the multiresolution spatial filter.

The system and method of the invention allow image noise to be minimized while avoiding motion lag in dynamic regions of the image and preserving spatial detail in static regions of the image. Hence, image resolution for both static and dynamic image regions may be increased.

Figure 1:
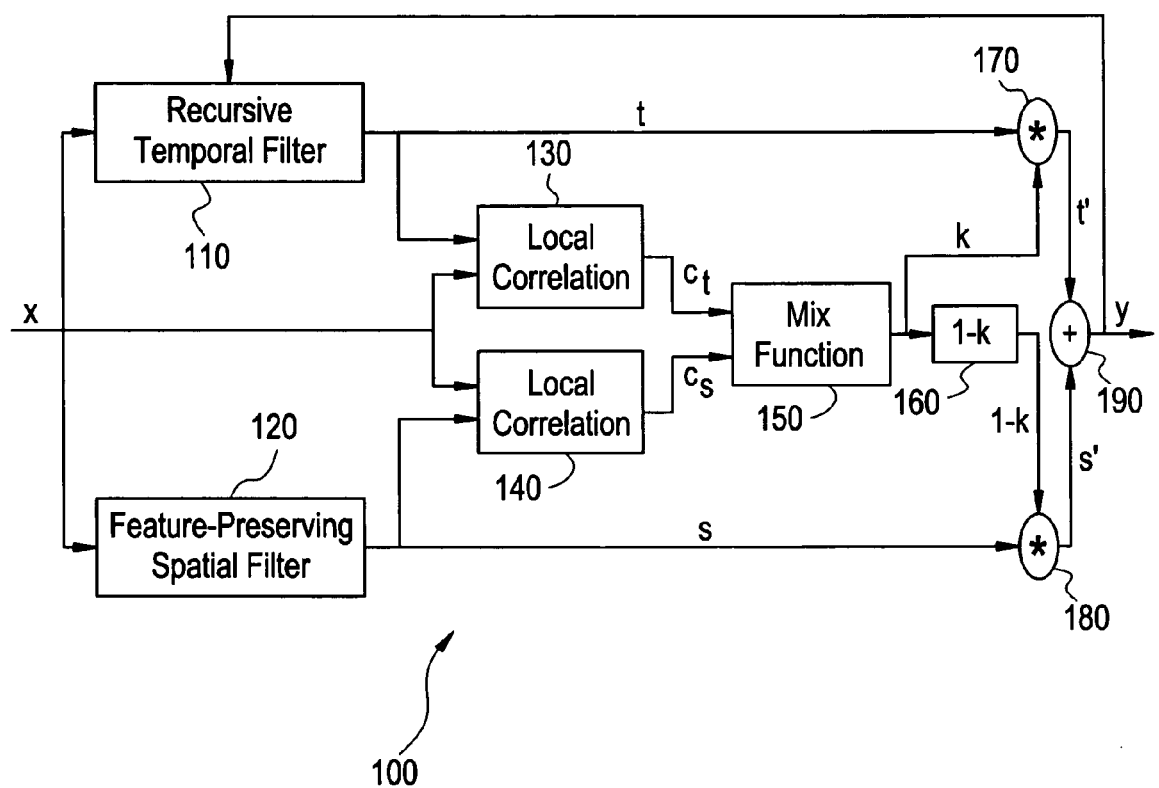
FIG. 1 illustrates a data flow diagram of a minimal-difference spatiotemporal (MDST) filter used in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

FIG. 1 illustrates a data flow diagram 100 of a minimal-difference spatiotemporal (MDST) filter used according to an embodiment of the present invention. The data flow diagram 100 represents various units and flow of data in computing an output signal y from an input signal x. The input signal x is input into four units. The input signal x is input into a recursive temporal filter 110, a feature preserving spatial filter 120, a local correlation unit 130, and a local correlation unit 140. The feature preserving spatial filter 120 and the recursive temporal filter 110 produce outputs s and t respectively. The outputs t and s are input into the multiplication units 170 and 180 respectively. The outputs t and s are also input into the local correlation units 130, 140 respectively, together with input signal x. Local correlation units 130, 140 produce outputs $c_t$ and $c_s$, respectively. Outputs $c_t$ and $c_s$ are input into a mix function unit 150. The mix function unit 150 produces an output k, which is transmitted to a complementary unit 160 and a multiplication unit 170. Valid values of k may be 0 or 1, or between 0 and 1. The output of the complementary unit 160, (1−k), is transmitted to the multiplication unit 180. The output of the multiplication units 170, 180, t' and s', respectively, are combined at the addition unit 190 to form y, the output signal. The output signal y is also transmitted back to the recursive temporal filter 110 for use in computing a value of t for the next frame. The components of the system 100 may be separate units, may be integrated in various forms, and/or may be implemented in hardware and/or in software. Each component and signal is discussed below.

The MDST dataflow diagram 100 performs both temporal and spatial filtration separately. The temporal and spatial filter outputs are mixed in proportions that are related to how closely the outputs match the latest input signal x. The input signal x may be an input image, a frame of data, or a stream of pixels.

The recursive temporal filter 110 produces a weighted average of a previous frame $y_{prev}$ and an input signal x. The output of the recursive temporal filter is t:

$$t = x + a_1(y_{prev} - x) \qquad \text{Equation 1,}$$

where $a_1$ is an averaging coefficient as set within the recursive temporal filter 110.

The feature-preserving spatial filter 120 performs adjustable amounts of spatial filtration. The spatial filtration preserves important features of the input signal x. The output of the feature preserving spatial filter 120 is s.

The first local correlation unit 130 produces a location correlation signal $c_t$ by comparing t, which is the output of the temporal filter, with the input image x. The value of $c_t$ may increase as t approaches matching x. The value of $c_t$ may decrease as t recedes from matching x. The comparison of t and x is performed within the pixel's neighborhood. The second local correlation unit 140 produces the local correlation signal $c_s$ by comparing s, which is the output of the spatial filter, with the input image x in the pixel's neighborhood. By convention, high values of $c_s$ may indicate a high degree of local similarity between images s and x. Low values of $c_s$ may indicate, by convention, a high degree of local dissimilarity between images s and x. Similarly, the signal $c_t$ may encode the degree of local similarity between images t and x.

The outputs, $c_t$, $c_s$, of the correlation units 130, 140 are then input into the mix function unit 150. The mix function unit 150 determines how much spatial and temporal filtration may be in the output signal y based on the correlation values $c_t$ and $c_s$. The function has an adjustable bias toward spatial or temporal filtration. A mix function k used with an embodiment of the present invention is as follows:

$$k = \frac{1}{1+\left(\frac{c_s}{c_t}\right)^\gamma},\qquad \text{Equation 2}$$

where γ is an adjustable parameter which may be set by a system designer.

In an embodiment, output of the mixing function k lies between 0 and 1. The signal k represents the portion of temporal filtration which may be used in the output y. Hence, k is multiplied by t to obtain t'. The signal t' is a portion of t that contributes to the output image y.

The signal k is also input into a complementary unit 160. As k is input into the complementary unit 160, k is between 0 and 1, for example, and represents the portion of the temporal filtration which may contribute to the output image y. The complementary unit 160 produces an output (1−k), which represents a portion of the spatial filtration that may contribute to the output image y. The signal (1−k) is multiplied by s to obtain s'. The signal s' is a portion of s that contributes to the output image y.

The signals t' and s' are then added together by the addition unit 190 to create an output signal y. The signal y may incorporate a portion of the recursive temporal filter 110 and a portion of the feature preserving spatial filter 120. The output y is also sent back to the recursive temporal filter 110 for use in computing a new recursive temporal filter output value t.

Figure 2:
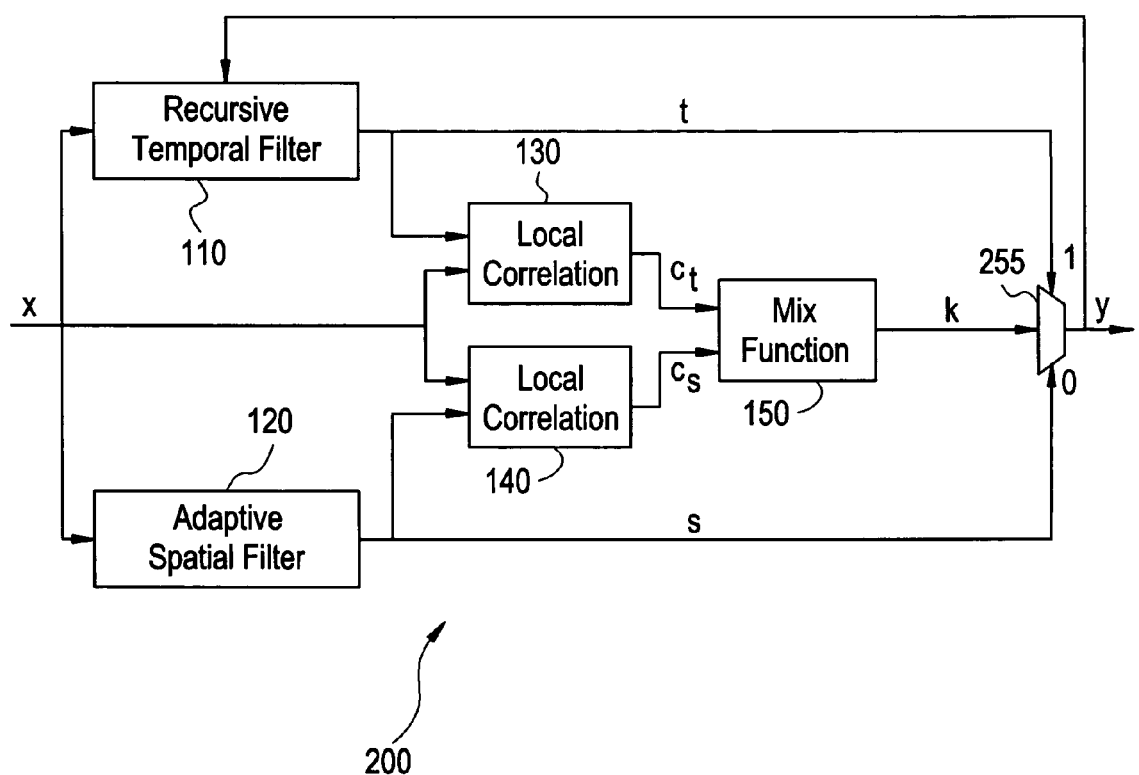
FIG. 2 illustrates a binary data flow diagram of a minimal difference spatiotemporal (MDST) filter used in accordance with an embodiment of the present invention.

Alternatively, the output y is entirely composed of either the output t of the recursive temporal filter 110, or the output s of the feature-preserving spatial filter 120. FIG. 2 illustrates a binary data flow diagram 200 of a MDST filter used in accordance with an embodiment of the present invention. The binary data flow diagram 200 is equivalent to data flow diagram 100, except the output k of the mixing function unit 150 is set to either 0 or 1, for example. Moreover, the binary data flow diagram 200 is functionally equivalent to data flow diagram 100 as gamma γ approaches infinity. The output y is therefore either entirely the output t of the recursive temporal filter 110, or entirely the output s of the feature preservation spatial filter 120. A multiplexer 255 selects the temporal output t when k=1 and the spatial output s when k=0. Hence:

$$y = \begin{cases} t & \text{if } k=1 \\ s & \text{if } k=0 \end{cases}.\qquad \text{Equation 3}$$

Other elements of FIG. 2 are equivalent to FIG. 1.

Figure 3:
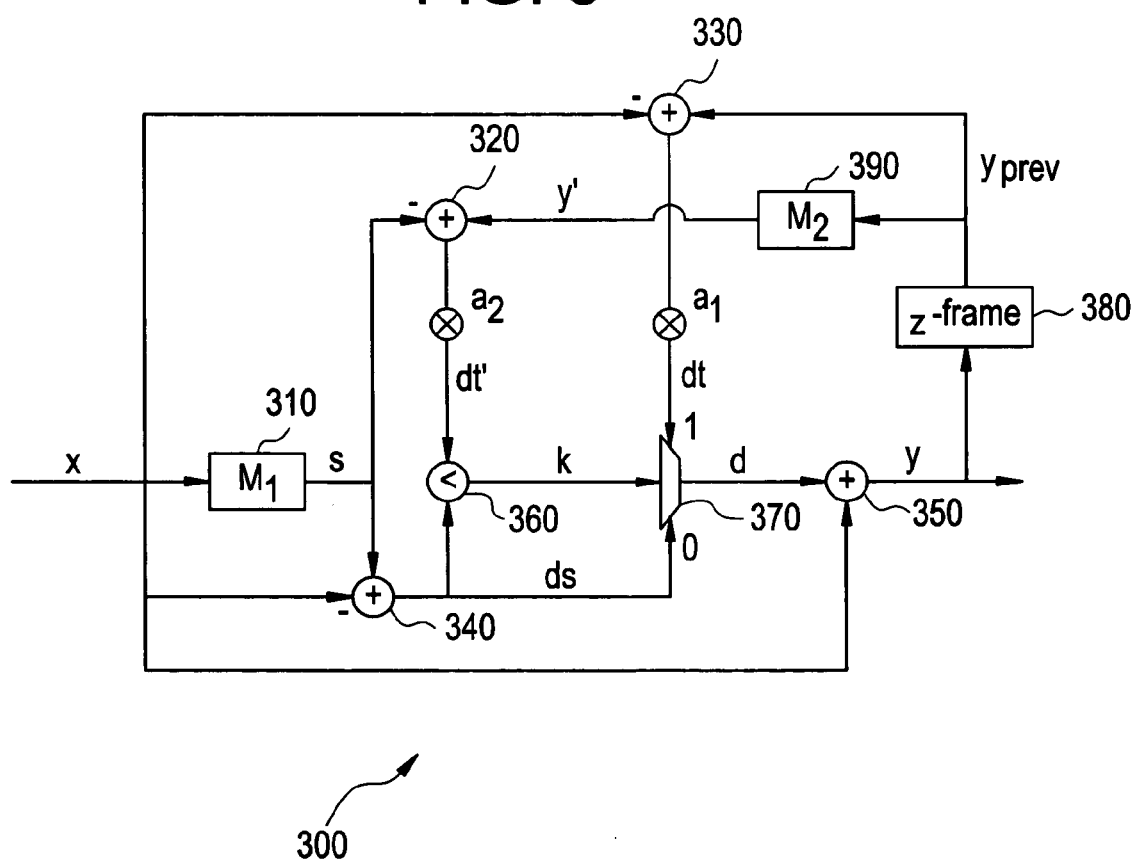
FIG. 3 illustrates a minimal-difference spatiotemporal system in accordance with an embodiment of the present invention.

FIG. 3 illustrates a system 300 for implementing a minimal-difference spatiotemporal filter in accordance with an embodiment of the present invention. The system 300 utilizes a modification of the binary data flow diagram 200 to select either spatial or temporal filtration for an input image frame x. In the system 300, x is input into four units. The input image x is input into a spatial filter 310, an addition unit 330, an addition unit 340, and an addition unit 350. The output of the spatial filter 310 is s. The signal s is fed into an addition unit 320 and an addition unit 340. The signal s is used to compute update/comparison signal ds and comparison signal dt'.

A spatial update signal ds is computed for direct use in the comparison unit 360 and as an input to the multiplexer 370. The spatial update/comparison signal ds is computed as $$ds = s-x \qquad \text{Equation 4,}$$

were ds represents a difference between the spatially smoothed version of x, which is s, and the input image x. The spatial update/comparison signal ds is then input into the comparison unit 360 and the multiplexer 370. The spatial update/comparison signal is directly compared to a temporal comparison signal in the comparison unit 360. The spatial update/comparison signal may also be selected to update input signal x, to create an output y, upon condition k=0.

A temporal update signal dt is also computed, along with a temporal comparison signal dt'. Both temporal update signal dt and temporal comparison signal dt' are functions of a previous frame of output, $y_{prev}$. The parameter $y_{prev}$ is created by passing the output y through a delay or buffer 380, $z^{-frame}$. The delay 380 delays the signal by one frame so that the output of the delay 380, $y_{prev}$, contains a signal y of the previous frame. The signal $y_{prev}$ is input into a spatial filter 390 and an addition unit 330.

The addition unit 330 computes the difference between the previous frame of output, $y_{prev}$, and the input image frame x. The addition unit 330 may perform addition or subtraction. The difference is then multiplied by a temporal filtration coefficient, $a_1$. The temporal filtration coefficient is generally between 0 and 1 and may be used to bias the system. Hence, dt, the temporal update signal, is computed as:

$$dt = a_1(y_{prev}-x) \qquad \text{Equation 5.}$$

The temporal update signal dt is used to produce the output y if selected by k. Hence, dt may be added to x as correction signal d, if selected by k.

However, the temporal comparison signal dt' used for comparison differs from the temporal update signal dt used to produce the output. The signal dt' is computed as a difference between a spatially-smoothed version of the previous frame and a spatially smoothed version of the current frame. The spatially smoothed version of the previous frame $y_{prev}$, is y'. The spatially smoothed frame y' is the result of passing $y_{prev}$ through a spatial filter 390. Passing $y_{prev}$ through spatial filter 390 is done to reduce the noise in k. The difference between the spatially smoothed previous frame, y', and the spatially smoothed current frame, s, is then multiplied by a temporal filtration coefficient $a_2$. The temporal filtration coefficient $a_2$ is generally between 0 and 1 and may be used in the system to introduce bias. Hence, dt' is computed as:

$$dt'=a_2[M_2(y_{prev})-M_1(x)] \quad \text{Equation 6,}$$

$$dt'=a_2[y'-s] \quad \text{Equation 7.}$$

In an embodiment, $a_1=a_2$ and the spatial filters $M_1$ and $M_2$ are identical. Alternatively, $a_2$ may differ from $a_1$ in order to control the bias of the system.

As mentioned above, dt' and ds are compared in the comparison unit 360. In an embodiment, the output k of the comparison unit 360 depends on which magnitude, ds or dt', is smaller. If dt'<ds, then k equals 1. If dt'≧ds, then k=0.

$$k = \begin{cases} 1 & \text{if } |dt'| < |ds| \\ 0 & \text{otherwise} \end{cases} \quad \text{Equation 8}$$

Thus, the system 300 may filter dynamic regions of an image through a spatial filter and static regions of an image through a temporal filter. The selection signal k may be thought of as a motion signal. If k=1, object motion is unlikely and temporal averaging is safe. If k=0, the likelihood of motion is high and spatial averaging is selected.

The output k is input into the multiplexer 370. If k is 1, the multiplexer 370 passes the temporal update signal dt. If k is 0, the multiplexer 370 passes the spatial update signal ds. The output signal y consists of the input signal x plus a correction signal d, when d equals either ds or dt:

$$y=x+d \quad \text{Equation 9,}$$

$$d = \begin{cases} dt & \text{when } k = 1 \\ ds & \text{when } k = 0 \end{cases} \quad \text{Equation 10}$$

Figure 4:
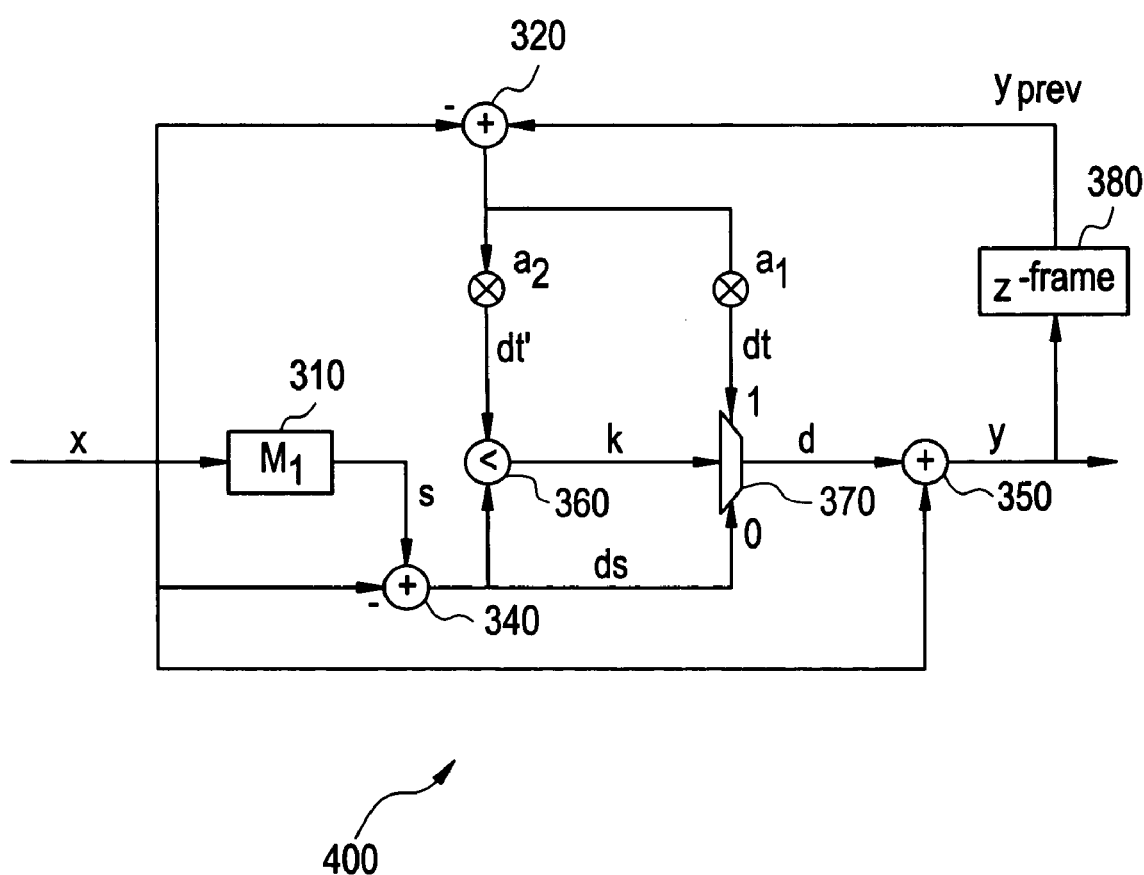
FIG. 4 illustrates an alternative minimal-difference spatiotemporal system in accordance with an embodiment of the present invention.

Alternatively, FIG. 4 illustrates a system 400 for implementing a minimal-difference spatiotemporal filter in accordance with an embodiment of the present invention. The system 400 is similar to the system 300, except the spatial filter 390 (M2) is removed from the system 300 to create the system 400. The removal of the spatial filter 390 (M2) from the system 300, and the subsequent change in data flow, may reduce the number of computations the system 300 performs. Hence, the benefit of using system 400 over the system 300 is that the system 400 is computationally less expensive.

However, removing spatial filter 390 (M2) may degrade a contrast-to-noise ratio of the system 300. In the system 300, an effect of the spatial filter M2 390 is to remove noise from the signal k, which is a binary signal. By removing M2, the system 400 becomes computationally less expensive to implement, but the possibility of k dithering between 0 and 1 increases.

Figure 5:
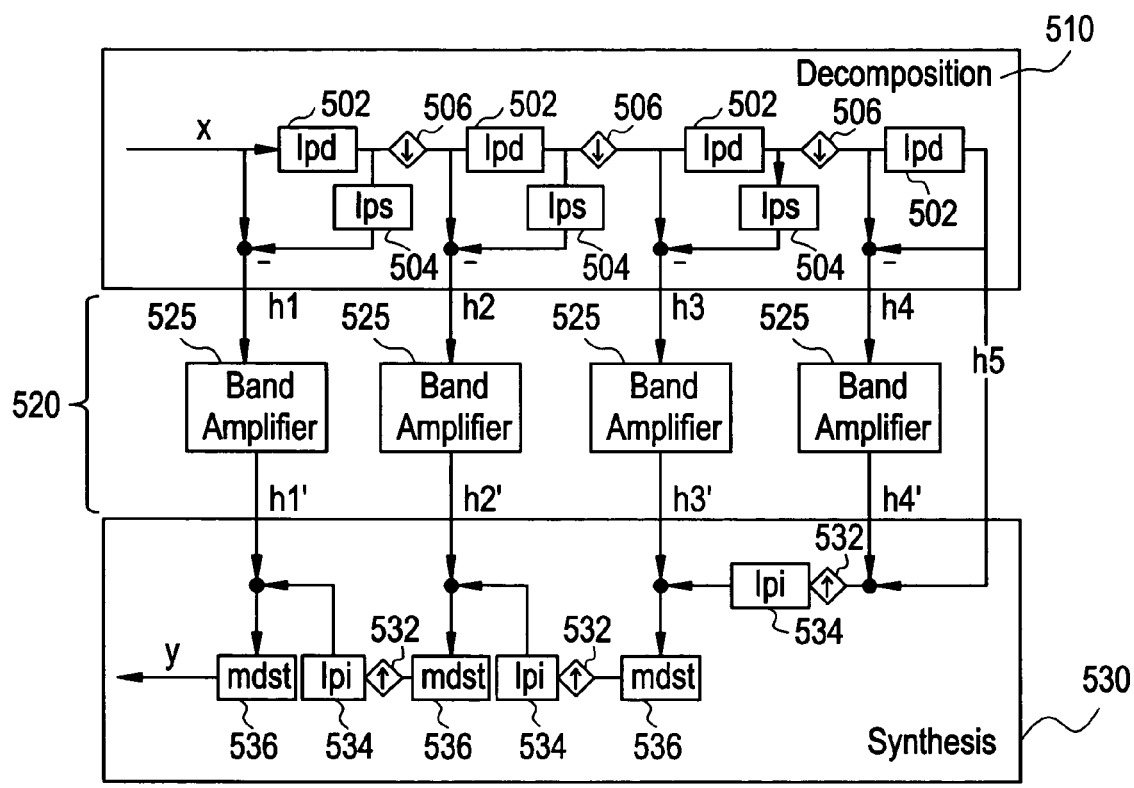
FIG. 5 illustrates a multiresolution spatial framework system which incorporates a minimal-difference spatiotemporal filter.

In another embodiment, the noise reduction capabilities of the MDST filter are improved when the MDST filter is incorporated into a multiresolution spatial framework. FIG. 5 illustrates a multiresolution spatial framework system 500 that incorporates an MDST filter in accordance with an embodiment of the present invention. In the system 500, the MDST filter may then detect motion and features at various spatial scales and reduce noise at different scales. The system 500 incorporates MDST in a synthesis phase of multiresolution spatial filter. The placement also allows MDST to have different spatial or temporal biases at different spatial scales. The article "The Laplacian Pyramid as a Compact Image Code," in the IEEE Transactions, C-31:532-540, 1983, by Burt, P. J. and Adelson E. H., discloses a typical multiresolution spatial framework and is hereby incorporated by reference.

FIG. 5 contains a decomposition phase 510, a processing phase 520, and a synthesis phase 530. The decomposition phase of a multiresolution spatial filter extracts bands of frequencies from an image. In the system 500, four bands of frequencies are extracted in the decomposition phase 510. However, any number of frequency bands may be extracted. The lpd blocks 502 are low-pass filters used for frequency band separation. The lps blocks 504 are filters for smoothing the data from the low-pass filters 502. The lps blocks 504 closely match the low-pass properties of the lpi 534 low pass interpolation filters. The correlation between the lps blocks 504 and the lpi low pass interpolation filters 534 may be done to match the spectral characteristics of the subtracted signal in the decomposition phase with the spectral characterizes of the added signal in the synthesis phase. High-pass information may be extracted by unsharp masking, for example. Unsharp masking subtracts a smoothed version of the image from the original image. Hence, the smoothed version of the input is subtracted from the original input to create the high-pass information. The low-frequency image is also down sampled by down sampling units 506, and the process repeats.

The processing phase 520 of a multiresolution spatial framework performs an operation on the extracted frequency bands. In the system 500, as an example, a band amplifier 525 is shown to operate on the image data x. Typical operations performed on frequency band signals are linear gain to enhance detail or non-linear gain to enhance detail and minimize noise and halo artifacts.

In the synthesis phase 530, the signals are up sampled by the up sampling units 532. The signals are also passed through lpi 534 low pass interpolation filters. Also, in the synthesis phase 530, the signals are passed through an MDST filter 536 to produce an image with less noise than known multiresolution spatial frameworks.

Figure 6:
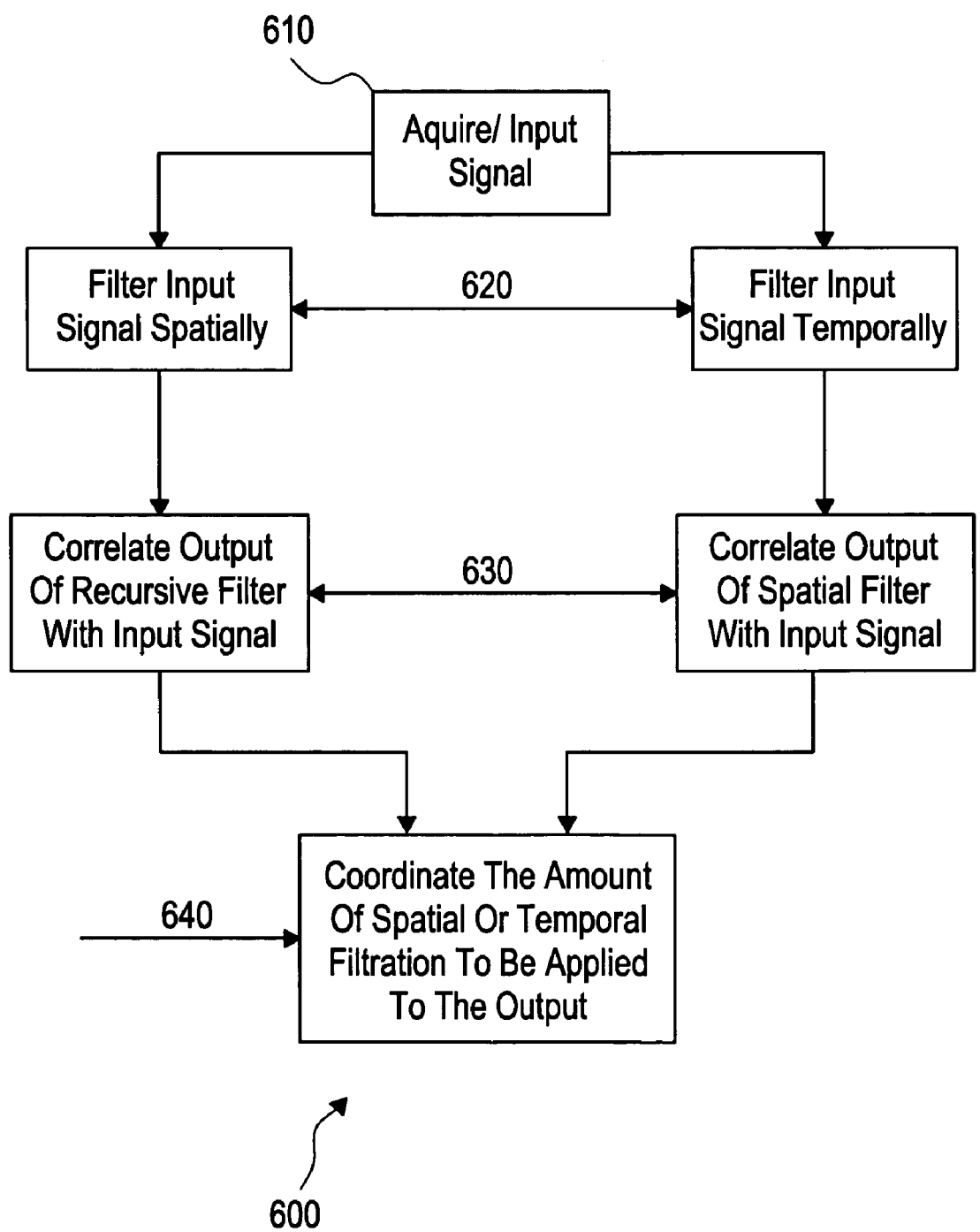
FIG. 6 illustrates a method for implementing a minimal-difference spatiotemporal filter in accordance with an embodiment of the present invention.

FIG. 6 illustrates a method 600 for implementing a minimal-difference spatiotemporal filter in accordance with an embodiment of the present invention. At step 610, an input image or signal is acquired. As mentioned above, the input image may be a frame of data, an image, or a stream of pixels. At step 620, the input image is passed through two separate filters. The input image is filtered both spatially and temporally. At step 630, the outputs of the filters are correlated with the input signal. The output of the spatial filter is correlated with the input signal to determine a difference between the input signal, and the spatially filtered version of the input signal. The output of the temporal filter is correlated with the input signal to determine a difference between the input signal, and the temporally filtered version of the input signal. In an embodiment, both correlations produce an output. At step 640, the output of the correlations are used to coordinate the amount of temporal or spatial filtration to be applied to the output.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A system for filtering image data, said system comprising:
   a temporal filtration unit for filtering image data using a temporal technique to produce a temporal filtration output;
   a spatial filtration unit for filtering said image data using a spatial filtration technique to produce a spatial filtration output;
   a first local correlation unit for correlating said image data with said temporal filtration output to produce a temporal correlation output;
   a second local correlation unit for correlating said image data with said spatial filtration output to produce a spatial correlation output;
   a mixing unit for coordinating said spatial correlation output and said temporal correlation output to produce a mixing unit output;
   a complementary unit for generating a complement of said mixing unit output;
   a multiplication unit for multiplying said temporal filtration output with said mixing unit output;
   a multiplication unit for multiplying said spatial filtration output with said complement of said mixing unit output; and
   an addition unit for adding a portion of said temporal filtration output and a portion of said spatial filtration output.

2. The system of claim 1, further comprising a multiplexer for receiving said mixing unit output.

3. The system of claim 2, wherein said multiplexer selects said temporal filtration output or said spatial filtration output based on said mixing unit output to alter an image.

4. A method of filtering image data, said method comprising:
   acquiring an input signal;
   filtering said input signal using a temporal filtration technique to produce a temporal filtration output;
   filtering said input signal using a spatial filtration technique to produce a spatial filtration output;
   correlating said temporal filtration output with said input signal to produce a correlation temporal output corresponding to a difference between said input signal and said temporal filtration output;
   correlating said spatial output with said input signal to produce a correlation spatial output corresponding to said difference between said input signal and said spatial filtration output;
   coordinating said correlation spatial output and said correlation temporal output to produce an output signal; and
   generating a complement of said output signal.

5. The method of claim 4, further comprising selecting either said spatial filtration output or said temporal filtration output based on a value of said output signal.

6. The method of claim 4, further comprising selecting a portion of said spatial filtration output and a portion of said temporal filtration output.

7. The method of claim 4, further comprising multiplying said temporal filtration output and said output signal.

8. The method of claim 4, further comprising multiplying said spatial filtration output and said complement of said output signal.

9. The method of claim 4, further comprising adding a portion of said spatial filtration output and a portion of said temporal filtration output to generate an altered image.

10. A system for filtering image data, said system comprising:
    a first spatial filtration unit for filtering image data using a spatial filtration technique to generate a first spatial filtration output;
    a comparison unit for comparing a temporal comparison signal with a spatial comparison signal;
    a multiplexer for receiving said comparison unit output and selecting a temporal update signal or a spatial update signal;
    a delay unit for delaying an output signal and producing a delay unit output;
    at least one multiplication unit for multiplying said temporal update signal;
    at least one multiplication unit for multiplying said temporal comparison signal;
    at least one addition unit for altering said data;
    at least one addition unit for use in creating said spatial update signal;
    at least one addition unit for use in creating said spatial comparison signal; and a second spatial filtration unit for filtering said delay unit output using a spatial filtration technique to generate a second spatial filtration output.

11. The system of claim 10, wherein said comparison unit output represents a binary number.

12. The system of claim 10, wherein said output signal includes said image data altered by said temporal update signal.

13. The system of claim 10, wherein said output signal is said data altered by said spatial update signal.

14. The system of claim 10, wherein said second spatial filtration output is used to compute said temporal comparison signal.

15. The system of claim 10, wherein said delay unit output is used to compute said temporal update signal.

* * * * *